March 7, 1950 J. A. ZINN, JR Re. 23,204

CARTON

Original Filed March 19, 1947 2 Sheets-Sheet 1

INVENTOR.
Julius A. Zinn, Jr.,
BY
Wilkinson, Huxley, Byron & Hume
Attys.

CARTON

Original Filed March 19, 1947 2 Sheets-Sheet 2

INVENTOR.
Julius A. Zinn, Jr.,
BY
Wickersham, Hughey, Bryson & Hume
Attys.

Reissued Mar. 7, 1950

Re. 23,204

UNITED STATES PATENT OFFICE 23,204

CARTON

Julius A. Zinn, Jr., Chicago, Ill.

Original No. 2,464,065, dated March 8, 1949, Serial No. 735,663, March 19, 1947. Application for reissue November 3, 1949, Serial No. 125,367

15 Claims. (Cl. 229—14)

Matter enclosed in heavy brackets [ ] appears in the original patent but forms no part of this reissue specification; matter printed in italics indicates the additions made by reissue

The present invention relates to improvements in cartons.

An object of the present invention is to provide an improved carton in which strength and rigidity are attained with the use of relatively thin gauge material.

A further object is to provide an improved carton which may be made from a simple blank in which wastage of material is minimized.

A further object is to provide an improved carton which, though made of relatively light material, may be readily sealed, even though it contains only relatively lightweight, compressible, non-rigid material.

A further object is to provide an improved carton having an outer wall and a liner secured to said wall which carton may be readily assembled without rupturing the adhesion between said outer wall and said liner.

A further object is to provide an improved carton which is sturdy in construction, relatively cheap to manufacture, neat in appearance and well adapted to hold fine grain or liquid material.

A further object is to provide an improved blank for forming cartons of the kind above referred to.

A further object is to provide an improved liner adapted to be secured to a blank for forming a carton.

A further object is to provide an improved carton well adapted to meet the needs of commercial service.

Further objects will appear as the description proceeds.

Referring to the drawings—

Figure 1:
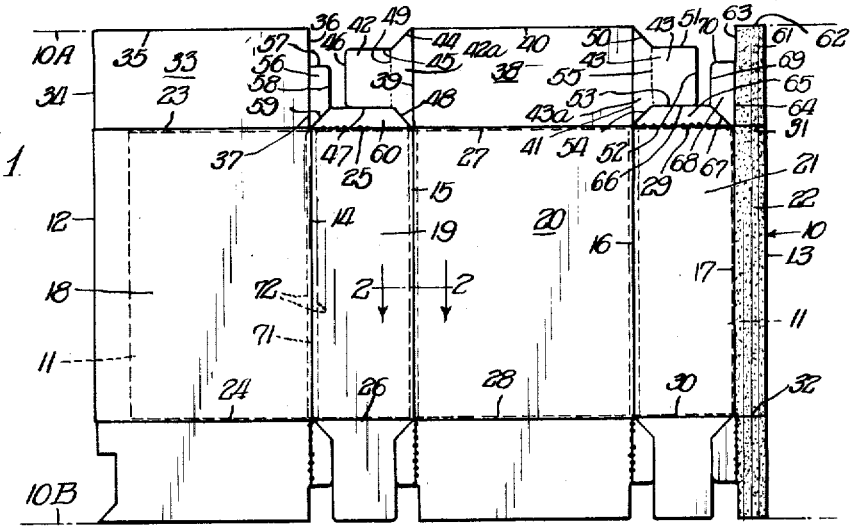
Figure 1 is a view of a blank having a liner attached thereto which blank and liner embody the principles of the present invention.
Figure 4:
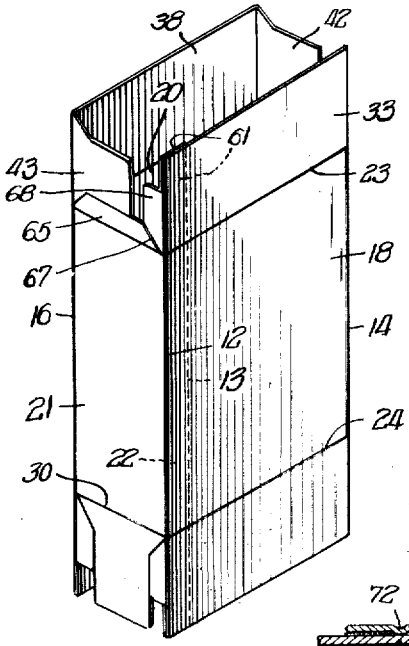
Figure 4 is a view in perspective of a blank having the four side walls thereof assembled in operative position but having the top and bottom walls thereof not yet in operative position.

Referring first to Figure 1, the numeral 10 indicates a blank which may be made from a sheet of cardboard or the like. The particular blank chosen for illustration is intended for a carton having uniform rectangular cross section throughout its length with end walls disposed in right angular relationship with the side walls though the invention is equally applicable to cartons having tapering walls, that is, cartons of the nesting type, as illustrated, for example, in applicant's Patent No. 2,390,909 patented December 11, 1945. Secured to the under surface of the blank as illustrated in Figure 1, which will be the inner surface thereof when the blank is shaped into a carton, is the liner 11. Said liner will be adhesively attached to the blank 10 throughout the area of said liner except at regions adjacent to the crease lines of said blank, as will be explained presently.

The blank 10 chosen for illustration is generally rectangular in outline, the top and bottom edges lying in the parallel lines 10A and 10B respectively. Said blank has the parallel side edges 12 and 13 and is provided with the spaced crease lines 14, 15, 16 and 17. Crease line 14 is spaced from the side edge 12 and the crease line 16 is spaced from the crease line 15 to provide either the front or rear wall of the carton. Crease line 15 is spaced from the crease line 14 and the crease line 17 is spaced from the crease line 16 to provide each of the two opposite narrow side walls of the carton. The space between the crease line 17 and the edge 13 is a connector section and is utilized for securing the blank into a continuous outline rectangular in cross section. The part of the blank 10 between the edge 12 and the crease line 14 provides the relatively wide wall or panel 18, referred to hereinafter as the first wall or panel. The portion between the crease lines 14 and 15 provides the relatively narrow wall or panel 19, referred to hereinafter as the second wall or panel. The portion between the crease lines 15 and 16 provides the relatively wide wall or panel 20, referred to hereinafter as the third wall or panel, and the portion between the crease lines 16 and 17 provides the relatively narrow wall or panel 21, referred to hereinafter as the fourth wall or panel. The portion between the crease line 17 and the edge 13, indicated by the numeral 22, is a connector section and is adapted to be adhesively secured to the wall or panel 18.

The top and bottom edges of panel 18 (the first panel) are defined by the crease lines 23 and 24, respectively. The top and bottom edges of the panel 19 (the second panel) are defined by the crease lines 25 and 26, respectively. The top and bottom edges of the panel 20 (the third panel) are defined by the crease lines 27 and 28. The top and bottom edges of panel 21 (the fourth panel) are defined by the crease lines 29 and 30. The top and bottom edges of the connector section 22 are defined by the crease lines 31 and 32, respectively. The crease line 27 will preferably be disposed slightly higher than the crease lines 25 and 29, the crease lines 25 and 29 being in alignment with each other. The crease line 31 may be in alignment with the crease lines 25 and 29. The crease line 23 will preferably be slightly lower than the crease lines 25 and 29. These differences in the levels of the crease lines 23, 25, 29, and 31 will facilitate the folding of the top closure, as will appear presently. The difference in level of the crease line 27, with respect to the crease lines 25 and 29, will be approximately twice the thickness of the material of the blank. The level of the crease lines 25 and 29 will be spaced above the level of the crease line 23 approximately the thickness of said material.

The portion of the blank below the crease lines 24, 26 28, 30 and 32 will provide the bottom closure of the carton. The details of this bottom closure form no part of the present invention but are described and claimed in applicant's copending application Serial No. 750,954, filed May 28, 1947. However, the bottom closure of the carton may take any preferred form as, for example, that disclosed in Patent 2,390 909 dated December 11, 1945; or the top closure described and claimed in this application may be used if desired.

The crease lines 14, 15, 16, 17, 23, 27 31, 24, 26, 28, 30 and 32 will be ruled into the blank 10 on the undersurface thereof as the blank is viewed in Figure 1 so that said crease lines will bias the parts at the sides thereof to bend inwardly, that is toward the bottom side of the blank as viewed in Figure 1. Crease lines 25 and 29 will be ruled in from the top side of the blank as viewed in Figure 1. In this disclosure those crease lines ruled in from the bottom side of the blank will be indicated by plain solid lines whereas, those crease lines ruled in from the upper side of the blank as viewed in Figure 1 will be represented by solid lines having dots spaced therealong. Crease lines ruled in from the bottom side of the blank whereby to bias the parts thereof to bend inwardly will be referred to as direct crease lines. Those crease lines ruled in from the top side of the blank as viewed in Figure 1 will be referred to as reverse crease lines.

Located above the panel 18 and swingably connected thereto along the crease line 23 is a flap 33 having the edge 34 (offset slightly toward the right from the edge 12), the edge 35, the edge 36, and the crease line 37. Said edge 36 and crease line 37 are in alignment with each other but are offset slightly toward the left from the crease line 14.

The panel 20 (the third panel) is provided with the flap 38 swingingly connected thereto along the crease line 27, which flap 38 is defined by the crease line 27, the crease line 39, the edge 40 and the crease line 41. Said crease lines are set inwardly slightly from the crease lines 15 and 16 respectively. Extending from the left end of the flap 38 is *a web 42a which terminates in* the tab 42 and extending from the right end of the flap 38 is *a web 23a which terminates in* the tab 43. Said tab 42 *and web 42a are* [is] defined by the edge 44 extending from the juncture of the crease line 39 and the edge 40 in 45 degree relationship with the edge 40; the edge 45; the edge 46; the edge 47 and the crease line 48. Said crease line 48 is disposed in 45 degree relationship with the crease line 25 and communicates with the intersection of crease line 25 to crease line 15. As indicated above, the crease line 39 is offset slightly toward the right from the crease line 15. The edge 44 and the crease line 48 terminate at the broken line 49. The region bounded by the edge 44, the broken line 49, the crease line 48 and the crease line 39 [is a] *constitutes the* web [indicated by the numeral] 42*a*.

The tab 43 *and web 43a* extending from the right hand extremity of the flap 38 [is] *are* symmetrical with the tab 42. Said tab 43 *and web 43a are* [is] defined by the edge 50 extending in 45 degrees relationship with the edge 40 from the juncture of edge 40 with crease line 41; the edge 51; the edge 52; the edge 53; crease line 54 and the crease line 41. The edges 50 and 54 terminate at the broken line 55. The region bounded by the edge 50; broken line 55; crease line 54 and crease line 41 constitutes [a] *the* web [indicated by the numeral] 43*a*.

Joined to the flap 33 at the right end thereof is the web 56 defined by the crease line 37; the edge 57; the edge 58 and the crease line 59. Said web 56 is joined by means of said crease line 59 to the web 60 joined to the panel 19 (second panel). Said crease line 59 extends in 45 degree relationship with the crease line 25 from the juncture of said crease line 25 with the crease line 14. The web 56 and the web 60 provide a web-corner, and the web 60 and web 42a provide another web-corner, which web-corners contribute to the sift-proofness of the top closure of the carton.

The connector section 22 is provided with the flap 61 which is defined by the edge 13; the edge 62; the edge 63; crease line 64 and the edge 31. The edge 63 and crease line 64 are in alignment with each other but are offset slightly toward the right from the crease line 17 to facilitate folding of the top closure.

Swingingly connected to the panel 21 is the web 65 defined by the crease line 29; crease line 54; edge 66 (which lies closely adjacent to the edge 53) and crease line 67. Joined to the web 65 is the web 68 projecting from the side of the flap 61. Said web 68 is defined by the crease line 67; the edge 69; the edge 70 and crease line 64. The crease lines 54 and 67 are disposed in 45 degree relationship with the crease line 29 and the extremities of said crease lines 54 and 67 communicate respectively with the juncture of crease line 29 with crease line 16 and the juncture of crease line 29 with crease line 17. The webs 43a and 65 and the webs 65 and 68 provide web-corners contributing to the sift-proofness of the upper closure of the carton.

Figure 2:
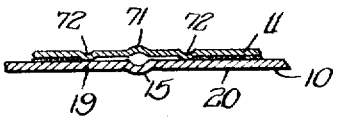
Figure 2 is a sectional view on an enlarged scale showing parts of said blank and liner, said view being taken in the direction of the arrows 2—2 of Figure 1.
Figure 3:
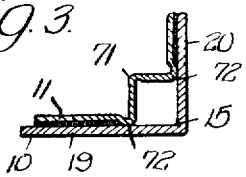
Figure 3 is a fragmentary view in cross section showing a corner fold of the blank with the liner attached thereto.

The present invention contemplates the provision of a liner for the four side walls of the carton which liner is indicated by the numeral 11 in Figures 1, 2 and 3. Said liner will be provided with a series of sets of score lines, each of said sets comprising a center score line indicated by the numeral 71 and a pair of score lines 72—72 parallel with but spaced from the center score line 71. Each score line 71 is intended to be located in juxtaposition with a crease line 14, 15 or 16 of the blank 10. The liner 11 will be adhesively secured to the inner wall of the blank (that is, the under side as the blank is viewed in Figure 1) but the regions adjacent to each center score line 71 between the adjacent score lines 72—72 are left free of adhesive in order that no rupturing of the liner or of the adhesive between the liner and the blank 10 will occur when said blank is bent along the crease lines 14, 15 and 16.

Figure 5:
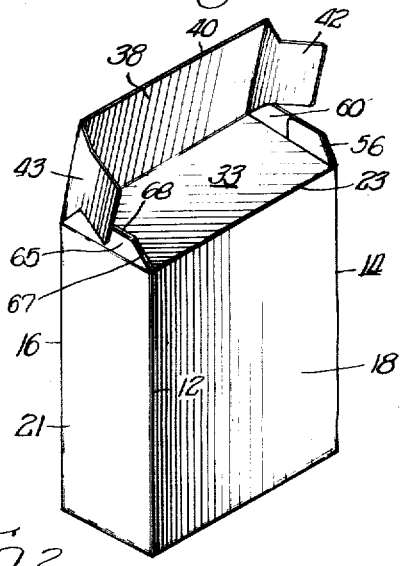
Figure 5 is a view similar to Figure 4 but with the bottom wall in operative position and showing the top wall at an intermediate stage of assembly.

The mode of operation of the above described embodiment of the present invention is substantially as follows:

Blank 10, as illustrated in Figure 1, may be readily bent along the crease lines 14, 15, 16 and 17 into a substantially rectangular contour. The connector section 22 will be located inside of the panel 18 (the first panel) and said connector section will be adhesively attached to the side of the panel 18 to provide a tube of approximately rectangular cross sectional contour. The flap 61 will also be adhesively secured to the flap 33. The bottom wall of the carton below the crease lines 24, 26, 28, 30 and 32 may be folded to provide a closure for the lower end of said tube, the details of this closure forming no part of the present invention. The carton thereby provided may be filled with material after which the top of the carton may be closed. The preferrred procedure in closing the top of the carton is as follows:

The upstanding flap 33 is swung inwardly about the crease line 23 as an axis into right angular relationship with the wall 28 carrying with it the flap 61 adhesively attached to said flap 33. This action will swing the webs 65 and 68 about the crease line 67 and will swing the webs 56 and 60 about the crease line 59. The flap 61 as well as the flap 33 will fit within the top of the carton, forming a strut between the wall 18 and the wall 20 thereof. The web 56 will be swung into flatwise engagement with the web 60 and the web 68 will be swung into flatwise engagement with the web 65, said webs 56 and 60 at one side of the carton and said webs 68 and 65 at the other side of the carton being swung outwardly with respect to the carton (Figure 5).

Figure 6:
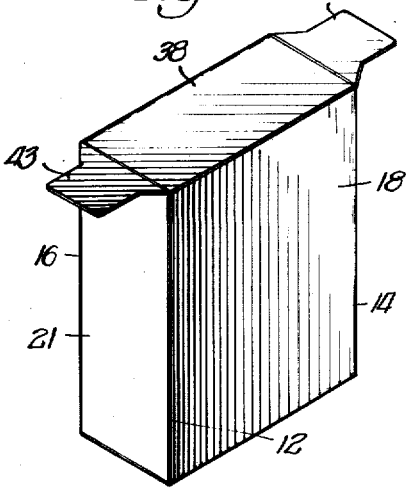
Figure 6 is a perspective view illustrating the top wall in a latter stage of assembly.
Figure 7:
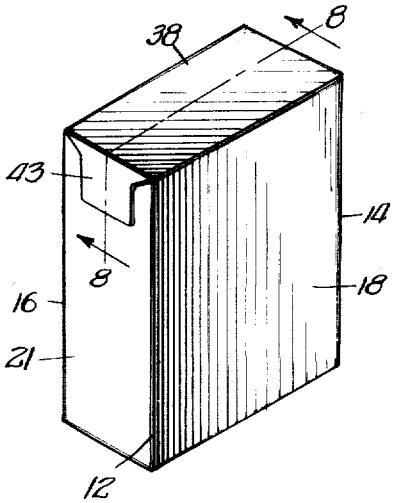
Figure 7 shows the completely sealed carton.
Figure 8:
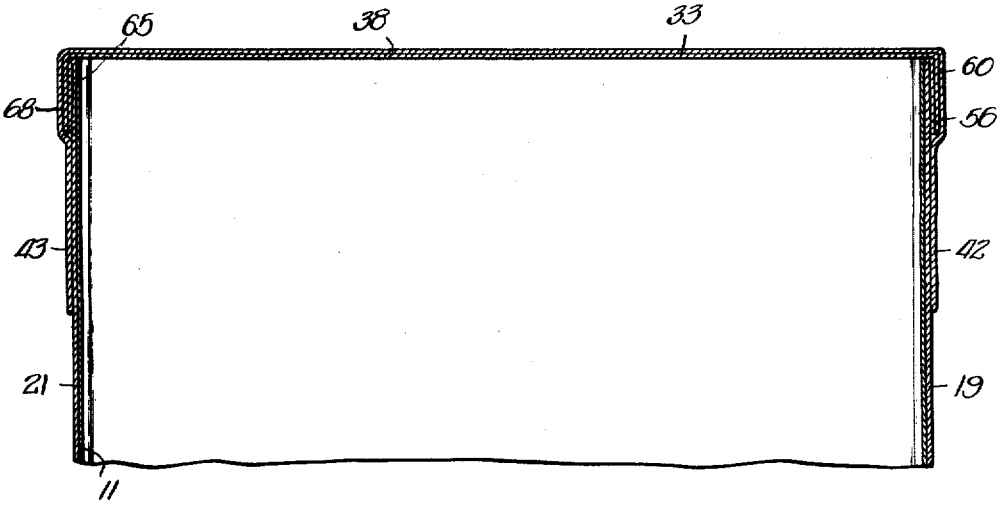
Figure 8 is a sectional view taken along the plane indicated by the arrows 8—8 of Figure 7.

The flap 38 will then be swung downwardly into flatwise engagement with the flap 33 whereby the parts will assume the positions illustrated in Figure 6. Adhesive will be used between the contacting faces, that is, the interfacial surfaces of the flaps 33 and 38 whereby said flaps will be secured together.

An important feature of the present invention is embodied in the efficient sealing of the webs 68 and 65 with the tab 43 (that is, the web portion 43a of said tab between the lines 41 and 55), as well as the efficient sealing of webs 56 and 60 with the tab 42 (that is, the web 42a thereof between the lines 39 and 49). Adhesive having been applied to the contacting surfaces, said webs 68 and 65 will be secured together and to the flap 43 and the webs 56 and 60 will be secured together and to the flap 42 by squeezing or gripping actions. The tabs 42 and 43 will then be drawn down into engagement with the panels 19 and 21, respectively, drawing the top flap 38 tight across the top of the carton. At this time sealing pressure is applied across the top of the carton, tightly sealing the flap 38 to the flap 33. The tabs 42 and 43 are securely attached to said panels 19 and 21. By reason of the adhesion of the webs 68, 65, 56 and 60 with their corresponding tabs 43 and 42 a tight sift-proof seal is had. By reason of the liner 11 extra side wall rigidity is provided so that an appreciable amount of pressure may be applied in the sealing operation without collapsing the carton.

The invention provides a carton which provides considerable rigidity, the rigidity being improved by reason of the laminated construction embodied in the material of the blank 10, the liner 11 and the adhesive film therebetween. All edges through which fine grained material may attempt to seep will be tightly sealed and a closure is provided which has uniform thickness. By reason of the novel liner arrangement, the required rigidity is attained without the necessity for using heavy materials. Said liner may be attached to the blank when said blank is in flat condition and may be folded up with the blank without danger of rupturing of the liner or of the adhesive material between the liner and the blank.

Though a preferred embodiment of the present invention has been described in detail, many modifications will occur to those skilled in the art. It is intended to cover all such modifications that fall within the scope of the appended claims.

What is claimed is:

1. A blank comprising a flat sheet having a first panel, a second panel, a third panel, a fourth panel and a connector section, said panels and connector section being divided from each other by crease lines, said connector section being adapted to lie flatwise against said first panel to provide a tube of rectangular cross section, one edge portion of said blank being formed to provide a flap for said first panel and to provide a flap for said third panel, said flap for said third panel being provided with *webs respectively extending over said second and fourth panels, each of said webs having a* tab[s] projecting *laterally* from the end[s] thereof, said connector section being provided with a flap, said flap for said first panel being provided with a web extending over said second panel, said second panel being provided with a web integrally connected with said [first mentioned] web *on said flap of said first panel* through a crease line and integrally connected through a crease line with one of said [tabs] *webs* on the flap for said third panel, the flap of said connector section being provided with a web extending over said fourth panel, said fourth panel being provided with a web, said last mentioned webs being integrally connected together through a crease line and integrally connected through a crease line to the adjacent [tab] *web* of the flap for said third panel.

2. A blank comprising a flat sheet having a first panel, a second panel, a third panel, a fourth panel and a connector section, said panels and connector section being connected to each other by crease lines, said connector section being adapted to lie flatwise against said first panel to provide a tube of rectangular cross section, one edge portion of said blank being formed to provide a flap for said first panel and a flap for said third panel, said flap for said third panel being provided with *webs respectively extending over said second and fourth panels, each of said webs having a* tab[s] projecting from the end[s] thereof, said connector section being provided with a flap, said flap for said first panel being provided with a web extending over said second panel, said second panel being provided with a web integrally connected with said [first mentioned] web *on said flap for said first panel* through a crease line and integrally connected through a crease line with one of said [tabs] *webs* on the flap for said third panel, the flap of said connector section being provided with a web extending over said fourth panel, said fourth panel being provided with a web, said last mentioned webs being integrally connected together through a crease line and integrally connected through a crease line to the adjacent [tab] *web* of the flap for said third panel, said flap for said first panel having dimensions to fit within said tube at the tops of said panels.

3. A blank comprising a flat sheet having a first panel, a second panel, a third panel, a fourth panel and a connector section, said panels and connector section being connected to each other by crease lines, said connector section being adapted to lie flatwise against said first panel to provide a tube of rectangular cross section, one edge portion of said blank being formed to provide a flap for said first panel and a flap for said third panel, said flap for said third panel being provided with *webs extending therefrom and terminating in* end tabs projecting from the ends thereof in directions at right angles to said crease lines, said connector section being provided with a flap, said flap for said first panel being provided with a web extending over said second panel, said second panel being provided with a web integrally connected with said [first mentioned] web *on said flap for said first panel* through a crease line and integrally connected through a crease line with one of said [tabs] *webs* on the flap for said third panel, the flap of said connector section being provided with a web extending over said fourth panel, said fourth panel being provided with a web, said last mentioned webs being integrally connected together through a crease line and integrally connected through a crease line to the adjacent [end tab] *web* of the flap for said third panel, each of said flaps for said first and third panels having dimensions to fit within said tube at the tops of said panels.

4. A blank comprising a flat sheet of material having crease lines dividing said sheet into a first panel, a second panel, a third panel, a fourth panel and a connector section, said connector section being adapted to be secured to said first panel to form a tube of substantially rectangular cross section, a part of said sheet being adapted to form a closure for said tube, said part including a flap swingingly connected to said first panel and having dimensions to fit within said tube at the tops of said panels, said part also including a flap swingingly connected to said third panel, said last mentioned flap having [tabs] *webs* projecting from the opposite ends thereof *and terminating in laterally projecting tabs*, said second panel being provided with a web, said first mentioned flap being provided with a web, said web of said second panel being integrally united with said web of said first mentioned flap and being also integrally united with one of said [tabs] *webs on said flap for said third panel*, the lines of union being in crease lines in substantially 45 degree relationship with the axes of swing of said webs [and said tab], said connector section having a flap, said flap having a web, said fourth panel having a web swingingly connected thereto, said webs of said connector section flap and said fourth panel being integrally connected together and to the other of said [tabs] *webs on said flap for said third panel* along crease lines disposed in substantially 45 degree relationship with the axes of swing of said webs.

5. A blank comprising a flat sheet of material having crease lines dividing said sheet into a first panel, a second panel, a third panel, a fourth panel and a connector section, said connector section being adapted to be secured to said first panel to form a tube of substantially rectangular cross section, a part of said sheet being adapted to form a closure for said tube, said part including a flap swingingly connected to said first panel, said part also including a flap swingingly connected to said third panel, said last mentioned flap having [tabs] *webs* projecting from the opposite ends thereof *and terminating in laterally projecting tabs*, said second panel being provided with a web, said first mentioned flap being provided with a web, said webs being integrally united together and to one of said [tabs] *webs on said flap for said third panel*, the lines of union being in crease lines in substantially 45 degree relationship with the axes of swing of said webs [and said tab], said connector section having a flap, said flap having a web, said fourth panel having a web swingingly connected thereto, said webs of said connector section flap and said fourth panel being integrally connected together and to the other of said [tabs] *webs on said flap for said third panel* along crease lines disposed in substantially 45 degree relationship with the axes of swing of said webs.

6. A carton comprising a first wall, a second wall, a third wall, a fourth wall and a connector section connected to said fourth wall and secured to said first wall to form a tube of substantially rectangular cross section and a closure for one end of said tube, said closure including a flap having a contour to fit within said carton at the top thereof, said flap being swingingly connected to said first wall, a flap swingingly connected to said third wall, said last mentioned flap having [tabs] *webs* projecting from the opposite ends thereof *and terminating in laterally projecting tabs*, said second wall being provided with a web, said first mentioned flap being provided with a web, said web secured to said second wall being integrally united with said web of said first mentioned flap and being also integrally united with one of said [tabs] *webs on said flap for said third wall*, the lines of union being crease lines in substantially 45 degree relationship with the axes of swing of said *webs* [web and said tab], said connector section having a flap, said flap having a web, said fourth wall having a web swingingly connected thereto, said last mentioned webs being integrally united along a crease line disposed in substantially 45 degree relationship with the [axes] *axis* of swing of said web of said fourth [panel]*wall*, said web of said fourth [panel] *wall* being integrally united with one of said [tabs] *webs on said flap for said third wall* along a crease line, said last mentioned crease line being in substantially 45 degree relationship with the [axes] *axis* of swing of said web of said fourth [panel] *wall*.

7. A carton comprising a first wall, a second wall, a third wall, a fourth wall and a connector section connected to said fourth wall and secured to said first wall to form a tube of substantially rectangular cross section, and a closure for one end of said tube, said closure including a flap swingingly connected to said first wall, a flap swingingly connected to said third wall, said last mentioned flap having [tabs] *webs* projecting from the opposite ends thereof *and terminating*

*in laterally projecting tabs,* said second wall being provided with a web, said first mentioned flap being provided with a web, said web secured to said second wall being integrally united with said web of said first mentioned flap and being also integrally united with one of said [tabs] *webs on said flap for said third wall,* the lines of union being crease lines in substantially 45 degree relationship with the axes of swing of said webs [and said tab], said connector section having a flap, said flap having a web, said fourth wall having a web swingingly connected thereto, said last mentioned webs being integrally united along a crease line disposed in substantially 45 degree relationship with the [axes] *axis* of swing of said web of said fourth [panel] *wall,* said web of said fourth [panel] *wall* being integrally united with one of said [tabs] *webs on said flap for said third wall* along a crease line, said last mentioned crease line being substantially 45 degree relationship with the [axes] *axis* of swing of said web of said fourth [panel] *wall.*

8. A blank comprising a flat sheet having a first panel, a second panel, a third panel, a fourth panel and a connector section, said panels and connector section being divided from each other by crease lines, said connector section being adapted to lie flatwise against said first panel to provide a tube of rectangular cross section, one edge portion of said blank being formed to provide a flap for said first panel and to provide a flap for said third panel, said flap for said third panel being provided with [tabs] *webs* projecting from the ends thereof *and terminating in laterally projecting tabs,* said connector section being provided with a flap, said flap for said first panel being connected to said second panel by means of a web-corner, said second panel being connected to one of said [tabs] *webs* for the flap of said third panel through a web-corner, said fourth panel being connected to the other of said [tabs] *webs* for the flap of said third panel through a web-corner and being connected to said flap for said connector section through a web-corner, said web-corners being defined by crease lines.

9. A blank comprising a flat sheet having a first panel, a second panel, a third panel, a fourth panel and a connector section, said panels and connector section being divided from each other by crease lines, said connector section being adapted to lie flatwise against said first panel to provide a tube of rectangular cross section, one edge portion of said blank being formed to provide a flap for said first panel and to provide a flap for said third panel, said flap for said third panel being provided with [tabs] *webs* projecting from the ends thereof *and terminating in laterally projecting tabs,* said connector section being provided with a flap, said flap for said first panel being connected to said second panel by means of a web-corner, said second panel being connected to one of said [tabs] *webs* for the flap of said third panel through a web-corner, said fourth panel being connected to the other of said [tabs] *webs* for the flap of said third panel through a web-corner and being connected to said flap for said connector section through a web-corner, said web-corners being defined by crease lines, said flap for said first panel having dimensions to fit within said tube at the tops of said panels.

10. A carton comprising a first wall, a second wall, a third wall, a fourth wall and a connector section connected to said fourth wall and secured to said first wall to form a tube of substantially rectangular cross section, and a closure for one end of said tube, said closure including a flap having a contour substantially equal to the cross sectional contour of the interior of said carton at the top thereof, said flap being swingingly connected to said first wall, a flap swingingly connected to said third wall, said last mentioned flap having [tabs] *webs* projecting from the opposite ends thereof *and terminating in laterally projecting tabs,* said flap of said first [panel] *wall,* said second [panel] *wall* and one of said [tabs] *webs* for the flap of said third [panel] *wall* being integrally connected through web corners, said connector section having a flap swingingly connected thereto, said fourth [panel] *wall* being integrally connected with the other of said [tabs] *webs* of the flap for the third [panel] *wall* and with said flap of said connector section through web-corners.

11. A carton comprising a first wall, a second wall, a third wall, a fourth wall and a connector section connected to said fourth wall and secured to said first wall to form a tube of substantially rectangular cross section, and a closure for one end of said tube, said closure including a flap swingingly connected to said first wall, a flap swingingly connected to said third wall, said last mentioned flap having [tabs] *webs* projecting from the opposite ends thereof *and terminating in laterally projecting tabs,* said flap of said first [panel] *wall,* said second [panel] *wall* and one of said [tabs] *webs* for the flap of said third [panel] *wall* being integrally connected through web-corners, said connector section having a flap swingingly connected thereto, said fourth [panel] *wall* being integrally connected with the other of said [tabs] *webs* of the flap for the third [panel] *wall* and with said flap of said connector section through web-corners.

12. A carton comprising a first wall, a second wall, a third wall, a fourth wall and a connector section connected to said fourth wall and secured to said first wall to form a tube of substantially rectangular cross section, and closure means for one end of said carton, said closure means including a flap swingingly connected to said first wall, a flap swingingly connected to said third wall and a flap swingingly connected to said connector section, said flap of said third wall having [tabs] *webs* projecting from the opposite ends thereof *and terminating in laterally projecting tabs,* said flap of said first wall having a web, said second wall having a web integrally united with said first mentioned web and with one of said [tabs] *webs on said flap for said third wall,* said flap of said connector section having a web, said fourth [panel] *wall* having a web integrally connected with the web of said flap of said connector section and with the other of said [tabs] *webs on said flap for said third wall,* said tabs *and said webs on said third wall* being adapted to be positioned in parallel relationship with *the others of* said webs and to be adhesively secured thereto while said tabs are in approximately co-planar relationship with the flap of said third wall while the flap of said third wall is lying flatwise against the flap of said first wall.

13. A carton comprising a first wall, a second wall, a third wall, a fourth wall and a connector section connected to said fourth wall and secured to said first wall to form a tube of substantially rectangular cross section, and closure means for one end of said carton, said closure means including a flap swingingly connected to said first wall, a flap swingingly connected to said third wall and a flap swingingly connected to said connector section, said flap of said third wall having [tabs] *webs* projecting from the opposite ends thereof *and terminating in laterally projecting tabs*, said flap of said first wall having a web, said second wall having a web integrally united with said first mentioned web and with one of said [tabs] *webs on said flap for said third wall*, said flap of said connector section having a web, said fourth [panel] *wall* having a web integrally connected with the web of said flap of said connector section and with the other of said [tabs] *webs on said flap for said third wall*, said tabs *and said webs on said third wall* being adapted to be positioned in parallel relationship with *the others of* said webs and to be adhesively secured thereto while said tabs are in approximately co-planar relationship with the flap of said third wall while the flap of said third wall is lying flatwise against the flap of said first wall, the connections between said webs [and between said webs and said tabs] being defined by crease lines disposed in 45 degree relationship with the axes of swing of said flaps.

14. A carton comprising a first wall, a second wall, a third wall, a fourth wall and a connector section connected to said fourth wall and secured to said first wall to form a tube of substantially rectangular cross section, and closure means for one end of said carton, said closure means including a flap swingingly connected to said first wall, a flap swingingly connected to said third wall and a flap swingingly connected to said connector section, said flap of said third wall having [tabs] *webs* projecting from the opposite ends thereof *and terminating in laterally projecting tabs*, said flap of said first wall having a web, said second wall having a web integrally united with said [first mentioned] web *on said flap for said first wall* and with one of said [tabs] *webs on said flap for said third wall*, said flap of said connector section having a web, said fourth [panel] *wall* having a web integrally connected with the web of said flap of said connector section and with the other of said [tabs] *webs on said flap for said third wall*, said tabs *and said webs on said third wall* being adapted to be positioned in parallel relationship with *the others of* said webs and to be adhesively secured thereto while said tabs are in approximately co-planar relationship with the flap of said third wall while the flap of said third wall is lying flatwise against the flap of said first wall, the connections between said webs [and between said webs and said tabs] being defined by crease lines disposed in 45 degree relationship with the axes of swing of said flaps, said crease lines communicating with the edges between said walls.

15. A carton comprising a first wall, a second wall, a third wall, a fourth wall and a connector section connected to said fourth wall and secured to said first wall to form a tube of substantially rectangular cross section, and closure means for one end of said carton, said closure means including a flap swingingly connected to said first wall, a flap swingingly connected to said third wall and a flap swingingly connected to said connector section, said flap of said third wall having [tabs] *webs* projecting from the opposite ends thereof *and terminating in laterally projecting tabs*, said flap of said first wall having a web, said second wall having a web integrally united with said [first mentioned] web *on said flap for said first wall* and with one of said [tabs] *webs on said flap for said third wall*, said flap of said connector section having a web, said fourth [panel] *wall* having a web integrally connected with the web of said flap of said connector section and with the other of said [tabs] *webs on said flap for said third wall*, said tabs *and said webs on said third wall* being adapted to be positioned in parallel relationship with *the others of* said webs and to be adhesively secured thereto while said tabs are in approximately co-planar relationship with the flap of said third wall while the flap of said third wall is lying flatwise against the flap of said first wall, the connections between said webs [and between said webs and said tabs] being defined by crease lines disposed in 45 degree relationship with the axes of swing of said flaps, said crease lines communicating with the edges between said walls, the edges of the flaps of said first and third walls being offset toward each other from the corresponding edges of said walls an amount approximately equal to the thickness of the walls of said carton.

JULIUS A. ZINN, JR.

REFERENCES CITED

The following references are of record in the file of this patent or the original patent:

UNITED STATES PATENTS

| Number | Name | Date |
|---|---|---|
| 1,947,664 | Staude | Feb. 20, 1934 |
| 2,331,010 | Waters | Oct. 5, 1943 |
| 2,390,909 | Zinn | Dec. 11, 1945 |
| 2,403,047 | Buttery | July 2, 1946 |

FOREIGN PATENTS

| Number | Country | Date |
|---|---|---|
| 536,926 | Great Britain | May 30, 1941 |

Certificate of Correction

Reissue No. 23,204 March 7, 1950

JULIUS A. ZINN, JR.

It is hereby certified that errors appear in the printed specification of the above numbered patent requiring correction as follows:

Column 3, line 38, for the patent number "2,390 909" read 2,390,909 ; line 62, for "swingably" read swingingly ; column 4, line 4, for "*web 23a*" read *web 43a* ; line 24, for "degrees" read degree ; column 5, line 36, for "wall 28" read wall 18 ; column 9, line 20, after "being" insert in ;

and that the said Letters Patent should be read with these corrections therein that the same may conform to the record of the case in the Patent Office.

Signed and sealed this 13th day of June, A. D. 1950.

[SEAL]

THOMAS F. MURPHY,
*Assistant Commissioner of Patents.*